United States Patent
O'Connor

(10) Patent No.: US 8,931,794 B2
(45) Date of Patent: Jan. 13, 2015

(54) BICYCLE FRAME WITH ADJUSTABLE GEOMETRY

(71) Applicant: Industries Rad Inc., Beauce (CA)

(72) Inventor: D'Arcy O'Connor, Vancouver (CA)

(*) Notice: Subject to any disclaimer, the term of this patent is extended or adjusted under 35 U.S.C. 154(b) by 163 days.

(21) Appl. No.: 13/756,769

(22) Filed: Feb. 1, 2013

(65) Prior Publication Data

US 2013/0214507 A1 Aug. 22, 2013

Related U.S. Application Data

(60) Provisional application No. 61/594,794, filed on Feb. 3, 2012.

(51) Int. Cl.
*B62K 15/00* (2006.01)
*B62K 19/00* (2006.01)
*B62K 25/28* (2006.01)

(52) U.S. Cl.
CPC ............... *B62K 19/00* (2013.01); *B62K 25/286* (2013.01)
USPC ......................................................... 280/284

(58) Field of Classification Search
CPC .................................. B60K 28/14; B62D 49/08
USPC ........... 280/283, 284, 288; 74/594.3; 475/170
See application file for complete search history.

(56) References Cited

U.S. PATENT DOCUMENTS

| | | | | |
|---|---|---|---|---|
| 676,629 A * | 6/1901 | Moore | | 74/594.3 |
| 697,944 A * | 4/1902 | Johnson | | 384/431 |
| 4,684,143 A * | 8/1987 | Sato | | 280/216 |
| 4,697,469 A * | 10/1987 | Takamiya et al. | | 74/117 |
| 4,712,450 A * | 12/1987 | Takamiya et al. | | 475/170 |
| 4,732,054 A * | 3/1988 | Takamiya et al. | | 475/166 |
| 4,793,208 A * | 12/1988 | Bregnard et al. | | 74/594.2 |
| 4,916,974 A * | 4/1990 | Kozakae et al. | | 475/166 |
| 5,161,430 A * | 11/1992 | Febey | | 74/594.7 |
| 5,387,000 A * | 2/1995 | Sato | | 280/216 |
| 5,516,132 A * | 5/1996 | Simkins | | 280/236 |
| 5,879,017 A * | 3/1999 | Debruin | | 280/259 |
| 6,073,950 A * | 6/2000 | Busby | | 280/284 |
| 6,099,010 A * | 8/2000 | Busby | | 280/284 |
| 6,474,193 B1 * | 11/2002 | Farney | | 74/594.3 |
| 6,820,517 B1 * | 11/2004 | Farney | | 74/594.3 |
| 6,895,834 B1 * | 5/2005 | Baatz | | 74/594.3 |
| 7,854,440 B2 * | 12/2010 | Girout et al. | | 280/259 |
| 7,891,688 B2 * | 2/2011 | Chamberlain | | 280/281.1 |
| 7,918,474 B2 * | 4/2011 | Waxham | | 280/288 |
| 8,430,415 B2 * | 4/2013 | Earle | | 280/284 |
| 8,561,498 B2 * | 10/2013 | Domahidy | | 74/570.1 |
| 2008/0296966 A1 * | 12/2008 | Choi | | 301/110.5 |
| 2014/0049020 A1 * | 2/2014 | Wendt et al. | | 280/259 |

* cited by examiner

*Primary Examiner* — Joseph M Rocca
*Assistant Examiner* — Conan Duda
(74) *Attorney, Agent, or Firm* — Norton Rose Fulbright Canada LLP

(57) ABSTRACT

A bicycle frame set includes a main frame, a rear wheel suspension pivotally attached to the main frame, and a double eccentric cam assembly disposed within one or more pivot joints between the main frame and the rear wheel suspension. The double eccentric cam assembly includes inner and outer eccentric cams removably fastened together and retained in place within the pivot joint by a removable fastener passing through an aperture in the inner eccentric cam and defining a pivot axis. The aperture is eccentric relative to a perimeter of the inner eccentric cam. The inner cam is received within a correspondingly shaped opening in the outer cam which opening is itself eccentric relative to a perimeter of the outer eccentric cam. A rotational position of each of the cams is thus adjustable, so as to change a relative location of the pivot axis of the pivot joint.

18 Claims, 8 Drawing Sheets

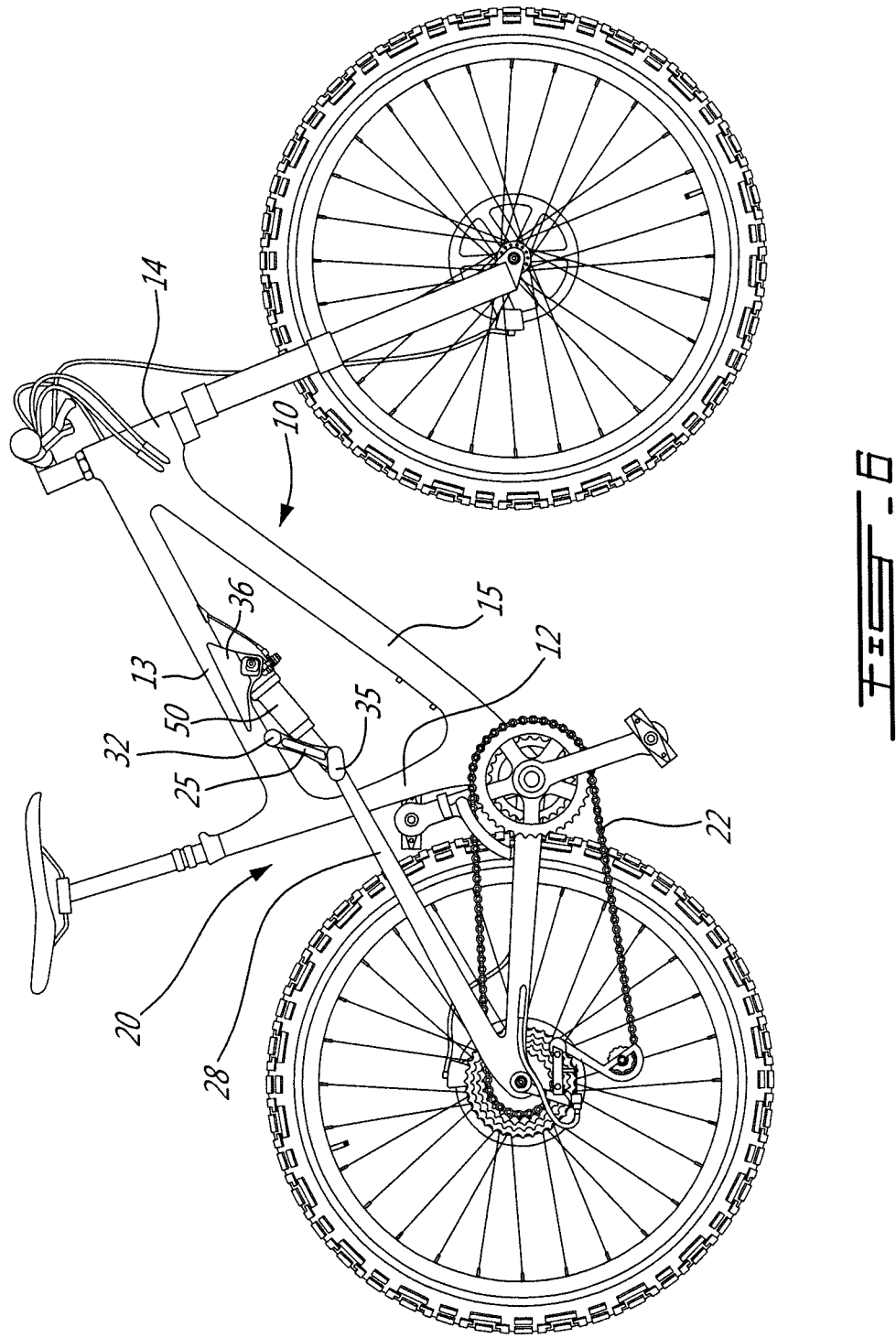

BICYCLE FRAME WITH ADJUSTABLE GEOMETRY

CROSS-REFERENCE TO RELATED APPLICATIONS

The present application claims priority on U.S. provisional patent application No. 61/594,794 filed Feb. 3, 2012, the entire contents of which is incorporated herein by reference.

TECHNICAL FIELD

The present relates generally to bicycles, and more particularly to a bicycle frame having adjustable frame geometry.

BACKGROUND

Continuous improvements to bicycles are being sought in an attempt to maximize rider performance and comfort, increase durability of parts, reduce weight, etc. Numerous factors influence the overall performance of a bicycle, such as frame strength and weight, component weight, amount of suspension compression, etc. One factor which is of particular pertinence to bicycles having a rear wheel suspension is the frame geometry and that of the rear wheel suspension system. More particularly, small changes in the geometry of a rear wheel suspension system of a mountain bicycle frame, and particularly the relative position of the various pivot points thereof, can have quite significant effects on the performance of the suspension and thus the bicycle riding dynamics, resulting in changes in rider comfort, pedaling efficiency, amount of compression, handling characteristics, etc. There are numerous bicycle suspension systems in use today. Such suspension systems allow the rear wheel of the bike to better track the terrain resulting in improved traction while pedaling, turning, and braking. Additionally, the absorption of bump forces by the suspension system increases rider comfort. These systems range from the simple to the complex. Regardless of the type, rear wheel suspensions on pedal powered bicycles generally provide a rider with the benefits of a more comfortable ride and better control over the bicycle. Such bicycle suspension systems improve ride quality by absorbing the shocks incurred from encountering ground obstacles, rather than transmitting them through the frame to the rider.

For a suspension to be suitable for use on a bicycle, it must be efficient. Ideally, a perfect rear wheel suspension would compress only in reaction to ground forces but not to drive-train or braking forces. Unwanted suspension movement resulting from drive train forces wastes rider energy. Bicycle suspensions can be designed to react principally to ground forces, and such that drive-train and braking forces which act thereon are limited, by careful selection of suspension type and geometry.

However, as mountain bicycles become more and more designed for specific types of riding, such as downhill, cross-country, free ride, etc., the required geometries of the frame sets intended to be used for each of these types of riding are significantly different. This results in many different frame geometries being needed.

The designer of a bicycle frame set (ex: including a main frame and a rear wheel suspension system) is able to weigh the various desired riding characteristics of the bicycle being designed, based on intended use of the bicycle for example, and then design a suitable suspension geometry accordingly. However, once the bicycle and/or suspension geometry has been selected for any bicycle, short of completely changing components (such as type or length of shock absorber, etc.), the end user of the bicycle is not able to significantly change the geometry and therefore the characteristics of the bicycle frame set. However, the ability to modify the geometry of a bicycle remains desirable and confers the ability to potentially adapt the fabricated bicycle to many riders or for different terrains. Generally, the length of the tubes and the angles at which they are attached define the frame geometry. In rear wheel suspensions, the relative location of the pivot points will also have an impact on the frame geometry and overall characteristcs of the bicycle.

It would thus be advantageous to be able to readily modify the geometry of a bicycle and/or its rear wheel suspension, without having to change components, or change the entire bicycle frame in order to vary the riding characteristics of the bicycle.

SUMMARY

In accordance with a first aspect of the present invention, there is provided a bicycle frame set comprising: a main frame including at least a seat tube, a top tube, a head tube and a down tube having a bottom bracket affixed thereto; a rear wheel suspension pivotally attached to said main frame by at least upper and lower frame pivots disposed at spaced apart locations on the main frame, said rear wheel suspension comprising: a first link member having an upper end pivotally connected to said top tube of the main frame by said upper frame pivot and having a lower end pivotably connected to a rearward end of a shock absorber at a first shock pivot; the shock absorber having a forward end pivotally connected to a shock mount on said main frame by a second shock pivot; a swing-arm having a forward end pivotally connected with said main frame at said lower frame pivot disposed proximate to the bottom bracket and a rearward end pivotally connected with a seat stay member; the seat stay member having a lower end pivotally connected to the swing-arm and an upper end pivotally connected with said first link member, and at least one of the lower end of the seat stay member and the rearward end of the swing-arm having a rear wheel dropout adapted for engaging a rear wheel axle thereto; at least one double eccentric cam assembly disposed within a correspondingly shaped opening in a mounting flange on the rear wheel suspension at one or more of the upper and lower frame pivots, the first and second shock pivots, and any pivots joints interconnecting the swing-arm, the seat stay member and the first link member, the double eccentric cam assembly including: an inner eccentric cam and an outer eccentric cam which when nested together and interlocked prevent relative rotation therebetween, the inner and outer eccentric cams being interlocked by a transversely extending fastener passing through an aperture in said inner eccentric cam such as to define a pivot axis, the aperture in the inner eccentric cam being eccentric relative to a perimeter of the inner eccentric cam, the inner eccentric cam being receiving within a correspondingly shaped opening in said outer eccentric cam which is itself eccentric relative to a perimeter of the outer eccentric cam; wherein a rotational position of each of said inner and outer eccentric cams being adjustable relative to each other and relative to the opening in the mounting flange within which the double eccentric cam assembly is disposed, such that a relative location of the pivot axis defined by the double eccentric cam assembly is adjustable relative to the mounting flange on the rear wheel suspension.

There is also provided, in accordance with another aspect of the present invention, a bicycle frame set comprising: a main frame including at least a seat tube, a top tube, a head tube and a down tube having a bottom bracket affixed thereto; a rear wheel suspension pivotally attached to said main frame by at least two pivots disposed at spaced apart locations on the main frame; a double eccentric cam assembly disposed within one or more pivot joint between the main frame and the rear wheel suspension, the double eccentric cam assembly including an inner eccentric cam and an outer eccentric cam removably fastened together and retained in place within the pivot joint by a transversely extending and removable fastener passing through an aperture in said inner eccentric cam and defining a pivot axis, the aperture in the inner eccentric cam being eccentric relative to a perimeter of the inner eccentric cam, the inner eccentric cam being received within a correspondingly shaped opening in said outer eccentric cam, said opening being itself eccentric relative to a perimeter of the outer eccentric cam; wherein a rotational position of each of said inner and outer eccentric cams is adjustable relative to each other and relative to the pivot joint within which the double eccentric cam assembly is disposed, so as to change a relative location of the pivot axis of the pivot joint.

There is further provided, in accordance with another aspect of the present invention, a pivot joint for providing relative rotation between frame components of a bicycle, the pivot joint comprising a double eccentric cam assembly having an outer eccentric cam interlocked with an inner eccentric cam, the inner and outer eccentric cams being fastened together and retained in place within the pivot joint by a transversely extending and removable fastener passing through an aperture in said inner eccentric cam, the fastener defining a pivot axis of the pivot joint therethrough, the aperture within the inner eccentric cam is eccentrically disposed relative to a perimeter of the inner eccentric cam, and said inner eccentric cam is received within a correspondingly shaped opening in the outer eccentric cam, said opening being eccentrically disposed relative to a perimeter of the outer eccentric cam, wherein a relative orientation of said inner and outer eccentric cams is rotationally adjustable so as to change a relative location of the pivot axis of the pivot joint.

BRIEF DESCRIPTION OF THE DRAWINGS

Reference will now be made to the accompanying drawings.

FIG. 6 is a side elevation view of a bicycle with the frame set of FIG. 1.

It will be noted that throughout the appended drawings, like features are identified by like reference numerals.

DETAILED DESCRIPTION

The bicycle frame set of the present disclosure includes a rear wheel suspension system and a main frame, which provides improved adjustability and/or variability of the frame geometry as may be desired in order to best suit or match a rider, type of riding (ex: downhill, cross-country, etc.) and/or the riding conditions. Although only the frame set 9 of the bicycle will be described in detail below, it is to be understood that a bicycle having such a frame set will also include all other commonly included components, such as wheels, seat, handle bars, gearing, derailleurs, etc.

Figure 1:
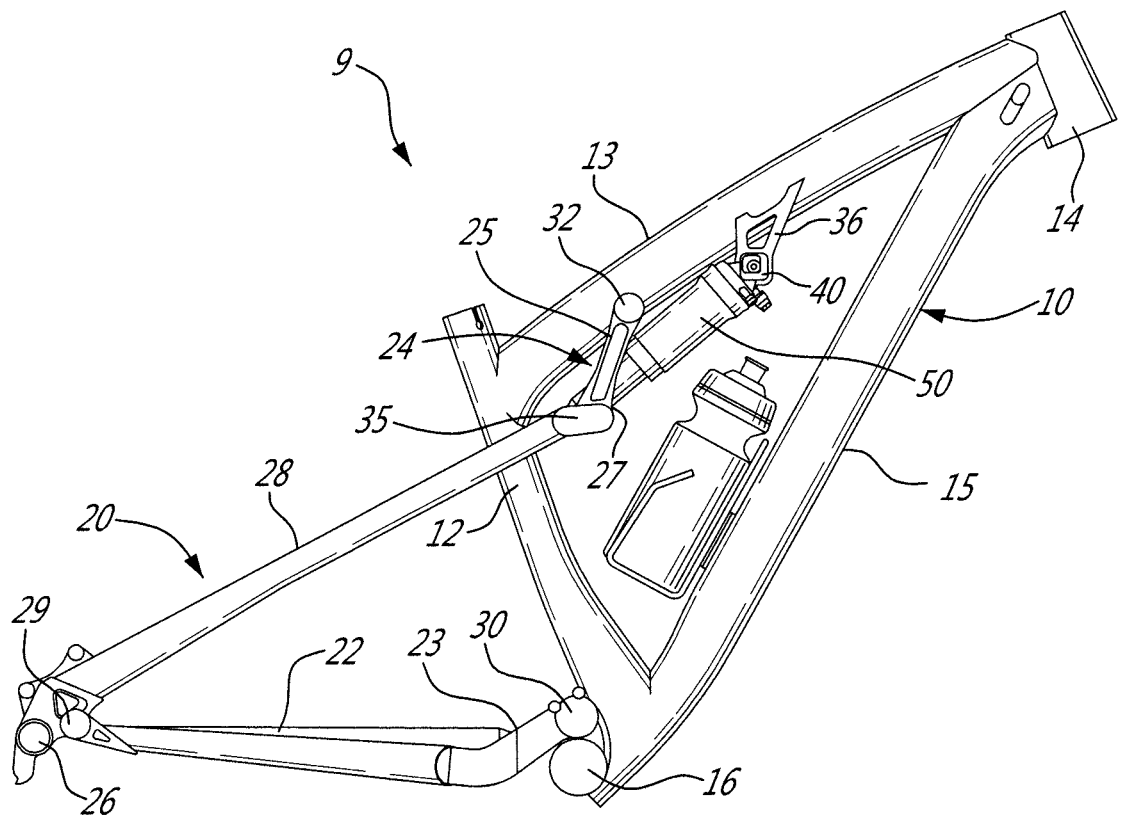
FIG. 1 is a side elevation view of a bicycle frame set having a variable suspension geometry in accordance with one embodiment of the present disclosure.
Figure 2:
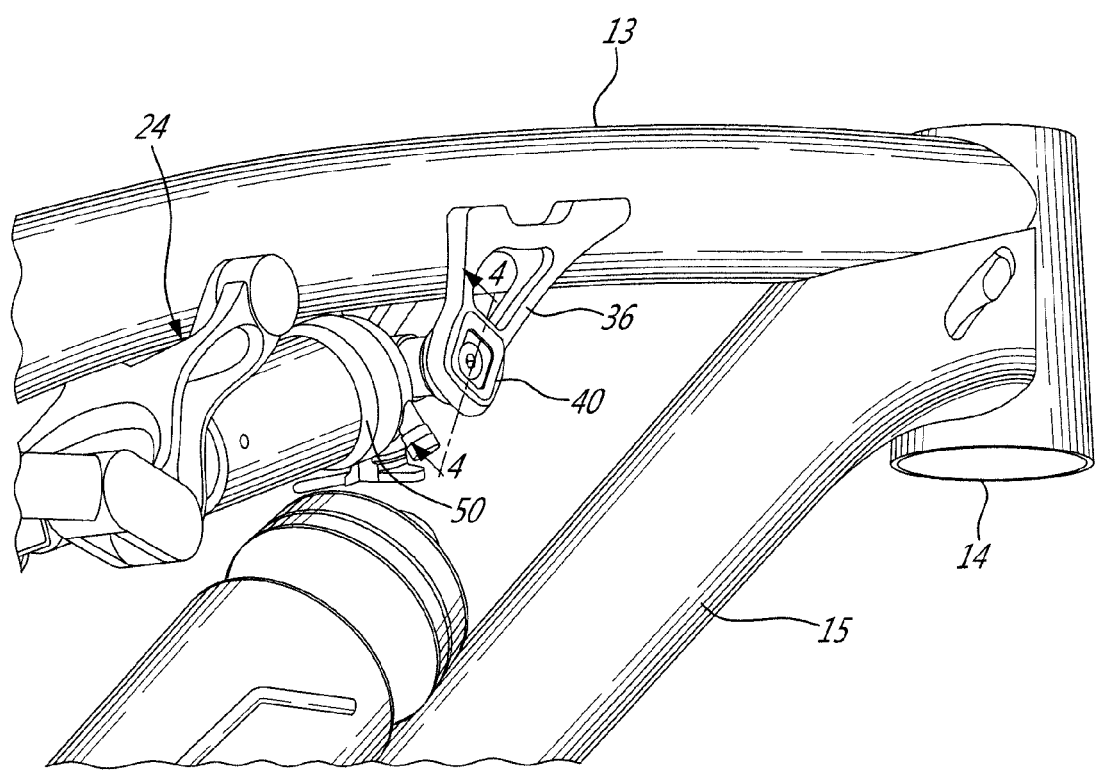
FIG. 2 is a partial perspective view of the bicycle frame set of FIG. 1, showing a double eccentric cam assembly at a pivot joint between the main frame and a shock absorber of the rear wheel suspension.

Referring now to FIGS. 1 and 2, the bicycle frame set 9 comprises a forward main frame section 10 having generally a seat tube 12, a top tube 13, a head or steering tube 14, a down tube 15, and a bottom bracket 16 disposed at a lower end of the down tube 15. The bicycle frame set 9 is intended to be used as a mountain bicycle, and includes a rear wheel suspension 20 which is pivotally mounted to the main frame 10 as will be seen below.

The rear wheel suspension system 20 is pivotally attached to the main frame 10 by at least two spaced-apart pivot points, which as seen in the embodiment depicted in FIG. 1 include lower pivot 30 and upper pivot 32. The rear wheel suspension system 20 generally comprises at least the following pivotally interconnected links: a swing arm (or chain stay) member 22; a seat stay member 28; and a first upper link member 24. A second or intermediate upper link member 35 may also be provided and pivotally interconnected between the seat stay member 28 and the first upper link member 24. Although a variable or virtual pivot point suspension may also be used, the rear wheel suspension system 20 of the depicted embodiment is a single or fixed pivot suspension system, in that the rear wheel moves about a fixed radius arc relative to the lower pivot 30 of the main frame 10. As seen in FIG. 1, the swing arm 22 is pivotally connected directly to the main frame 10 at a single location, namely lower pivot 30 disposed preferably just above the bottom bracket 16. The first upper link member 24 has an upper end 25 pivotally connected to the top tube 13 of the main frame 10 by top pivot 32 and a lower end 27 which is pivotally connected to a rearward end of a shock absorber 50. The lower end 27 of the first upper link member 24 is also pivotally connected to the seat stay member 28 at its upper end, either directly or via the intermediate link 35. The first link member 24 is pivotable about the top pivot 32 in a generally counter-clockwise direction when viewing the bike as depicted in FIG. 1, which is opposite the direction of rotation of the swing arm member 22. Accordingly, as the suspension 20 compresses, thereby compressing and thus shortening the shock absorber 50, the first upper link member 24 rotates counter-clockwise (when viewed from the right-hand side of the frame, as shown in FIG. 1) about the top pivot 32 such that the lower end 27 moves in a forward direction relative to the main frame 10.

The swing arm 22 has a lower forward end 23 which is pivotally connected with the main frame 10 by lower pivot 30. The seat stay member 28 is pivotally connected to the swing arm 22 at its rear end 29 and includes a rear wheel dropout 26 for receiving and engaging a rear wheel axle. The opposed, upper, end of the seat stay member 28 is pivotally connected to the first link member 24, either directly or via the intermediate link 35 as noted above.

As seen in FIG. 2, the forward end of the shock absorber 50 is mounted to at least one of the tubes of the main frame 10, such as but not limited to the top tube 13 for example, by a shock mounting bracket 36 fixed in place on the said tube of the main frame. The forward end of the shock absorber 50 is pivotally connected to the shock mounting bracket 36 of the main frame 10 by a double eccentric cam assembly 40 of the present disclosure, as will now be described in further detail. While in the presently described and depicted embodiment, the double eccentric cam assembly 40 is provided between the shock absorber 50 and the main frame, it is to be understood that the double eccentric cam assembly 40 described herein may be disposed at any pivot point between the rear suspension 20 and the main frame 10, such as at the lower pivot 30 for example, and/or alternately at any pivot joint between the links of the rear suspension 20 itself.

Figure 3:
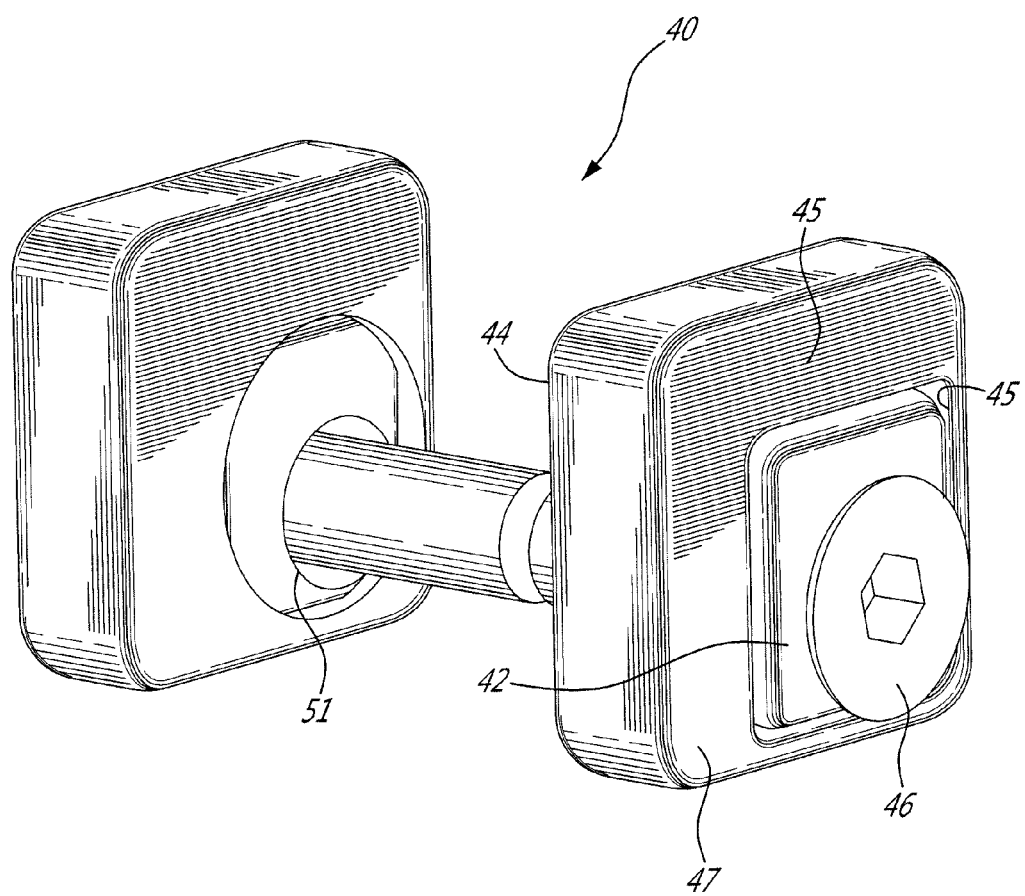
FIG. 3 is a perspective view of the double eccentric cam assembly of FIG. 2 shown in isolation.
Figure 4:
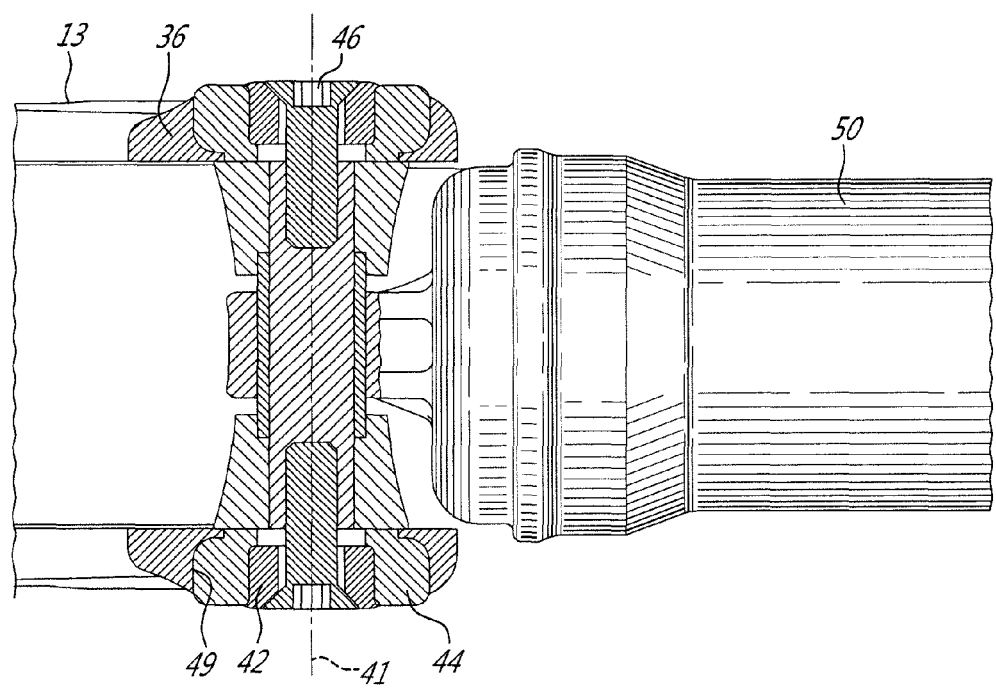
FIG. 4 is a partial cross-sectional view of the double eccentric cam assembly of FIG. 2, taken through line 4-4 in FIG. 2.

As best seen in FIGS. 3 and 4, the double eccentric cam assembly 40 comprises generally an inner eccentric cam 42 and an outer eccentric cam 44, which mate together to form an adjustable pivot joint assembly which interconnects at least one component of the rear suspension system 20 (in this case the forward end of the shock absorber 50) and the main frame portion 10 of the bicycle frame set 9. These cams 42, 44, or "chips", are removably mounted and engaged together such as to permit their selective replacement and/or rotational position relative to each other, in order to be able to vary characteristics of the bicycle such as its overall geometry, suspension travel, suspension rate, maximum force at bottom-out of the suspension, etc. A fastener 46 passes through an eccentrically disposed aperture or hole 51 (see FIG. 3) in the inner eccentric cam 42, and acts to laterally retain the inner and outer eccentric cams 42 and 44 together in engaged mating contact. The shock absorber 50 is pivotally connected to the fastener 46 of the assembly 40, which thereby forms an axle defining an axis of rotation 41 (see FIG. 4) about which the shock absorber 50 pivots at its upper end.

The inner eccentric cam 42 is received within a corresponding shaped cavity or opening 45 formed in the outwardly facing surface 47 of the outer eccentric cam 44, and is retained in place therewithin by the fastener 46. The perimeter of the inner eccentric cam 42 and the perimeter of the opening 45 of the outer eccentric cam 44 within which it is received have a corresponding and complementary shape, so that the inner eccentric cam 42 can be nested in the cavity or opening 45 of the eccentric cam 44 as seen in FIG. 3. Thus, once in this nested position, the inner eccentric cam 42 is not able to rotate (ex: about the transverse axis defined through the fastener 46). The outer eccentric cam 44 is received within a correspondingly sized and shaped opening 49 (see FIG. 4) in the shock mounting bracket 36. As such, much as per the nested inner and outer eccentric cams, when the outer eccentric cam 44 is located in position within the corresponding opening 49 in the shock mounting bracket 36, the outer eccentric cam 44 cannot rotate therewithin.

As best seen in FIG. 3, the opening 45 in the outer eccentric cam 44 is eccentrically disposed within the body of the outer cam 44 relative to its outer perimeter (i.e. the opening 45 is not centered relative to the outer perimeter). In the depicted embodiment, although not necessarily, the outer perimeter of the outer cam 44 is square in shape. Similarly, the outer perimeter of the inner cam 42 is also square in shape. The aperture or hole 51 in the inner eccentric cam 42, which receives the fastener 46 therethrough and which defines the axis of rotation 41 (see FIG. 4) of the double eccentric cam assembly 40 and therefore of the shock mounting pivot with the main frame, is also eccentrically disposed within the inner cam 42 relative to the outer perimeter of the inner cam 42 (i.e. the hole 51 is not centered relative to the outer perimeter of the inner cam 42, which itself is not centered relative to the outer perimeter of the outer cam 44).

Figure 5A:
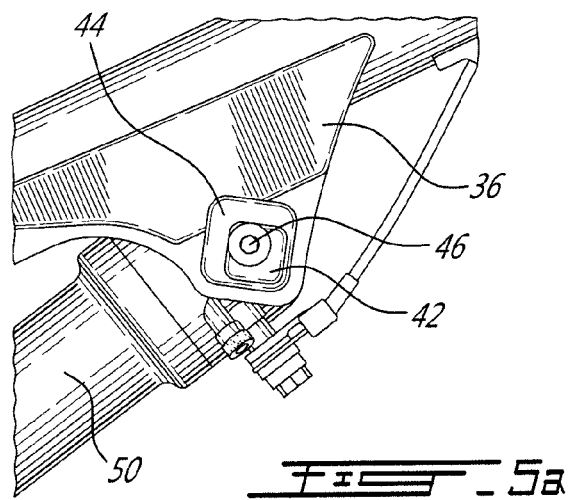
FIGS. 5a-5i are partial side views of the double eccentric cam assembly of FIG. 2, shown in each of nine different adjustment positions thereof.
Figure 5B:
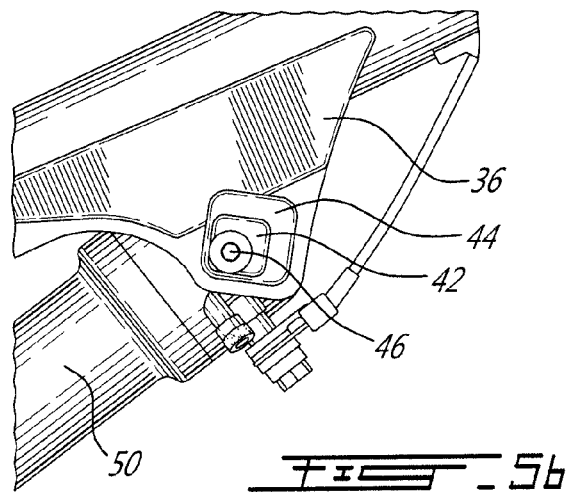
Figure 5C:
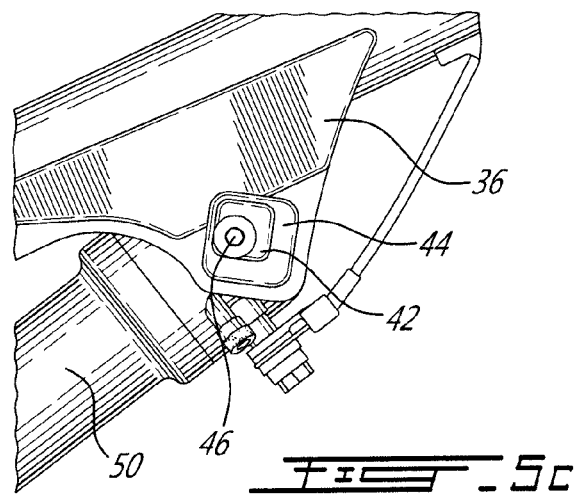
Figure 5D:
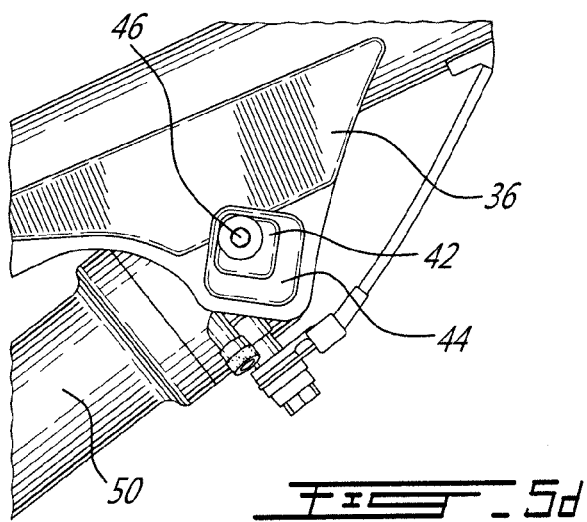
Figure 5E:
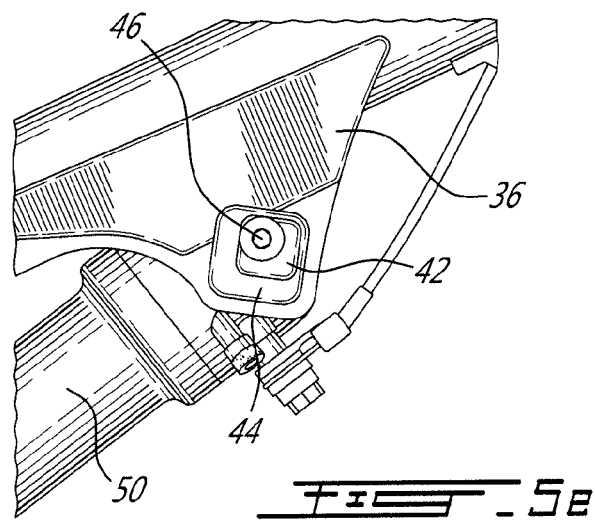
Figure 5F:
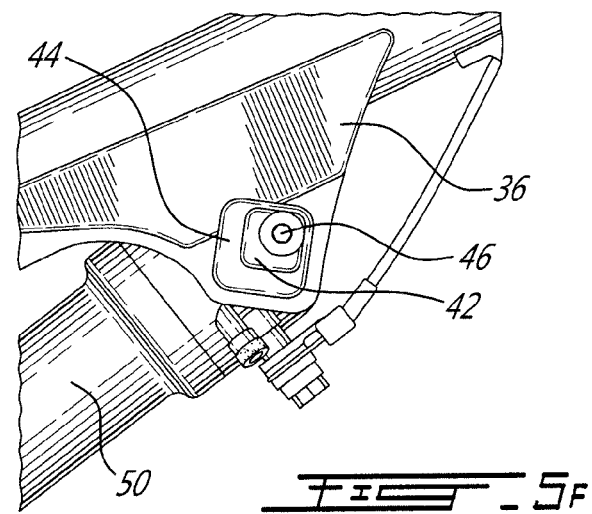
Figure 5G:
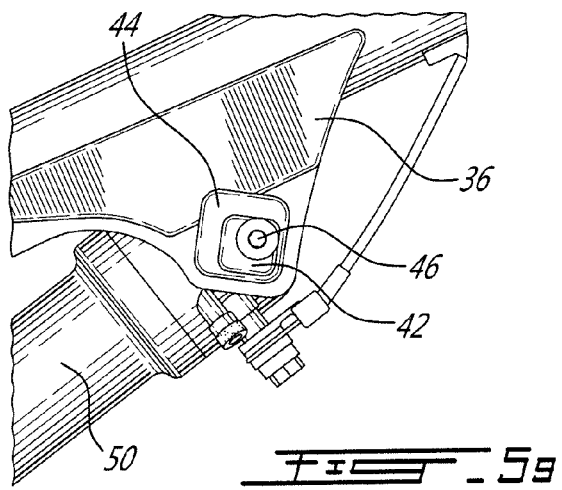
Figure 5H:
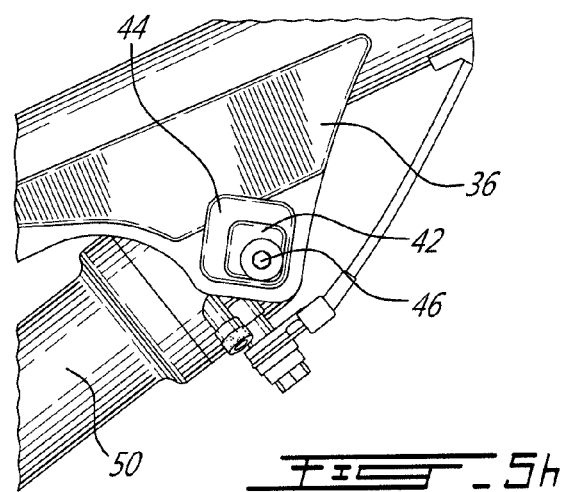
Figure 5I:
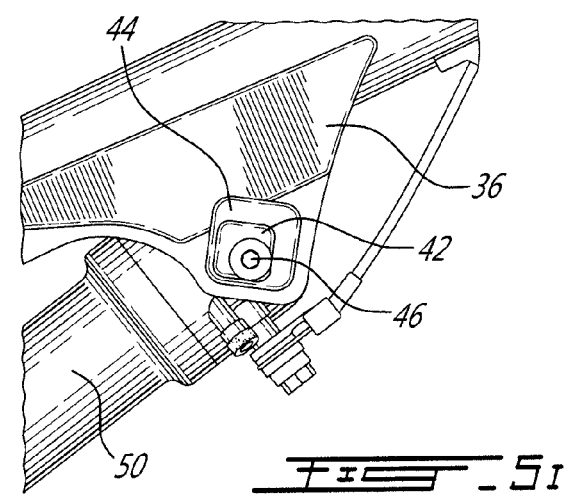

Because of this "double eccentric" mounting configuration of the assembly 40, the precise location of the fastener 46, which defines an axle through which extends the transverse axis of rotation 41 about which the shock absorber 50 pivots, relative to the surrounding mounting flange of the shock mounting bracket 36 (and therefore relative to the tube of the main frame 10 to which it is fixed) is variable. More particularly, by rotating one or both of the inner and outer eccentric cams 42, 44, the location of the axis of rotation 41 of the forward shock pivot, defined through the center of the fastener 46, can be adjusted away from a central or "neutral" position (as shown in FIG. 5a) within the surrounding mounting bracket 36 (possible when both the inner and outer eccentric cams are rotated 180 degrees from their positions depicted in FIG. 3, for example). By changing the relative positions of the inner and outer eccentric cams 42, 44 within the shock mounting bracket 36, the position of the pivot axis of the shock absorber 50 can be changed in space, and more particularly changed relative to the tube of the main frame 10 to which the shock absorber is fixed, such as the top tube 13 for example. Each of these different relative positions of the axis of rotation 41 of the presently described embodiment of the double eccentric cam assembly 40 is shown in FIGS. 5a-5i.

As an example only, by changing the orientation of only one of the inner and outer eccentric cams 42 and 44 in the shock mounting bracket 36, such that the position of the pivoting axle of the shock absorber 50 is moved by 3 mm as the cam is placed in different positions, lighter riders will be able to ride in a different position (for example position 3 in Table 1) and heavier riders can ride in position 1, which may be the default position for example.

TABLE 1

Geometry table following 3 mm eccentric cam adjustment at shock

| Position | Head angle (degrees) | BBH (mm) | Seat angle (degrees) | Rear travel (Y) (mm) | Bottom out force (lbs) |
|---|---|---|---|---|---|
| 1 (default) | 68 | 343.3 | 74.07 | 132.97 | 712 |
| 2 | 68.44 | 347.7 | 74.44 | 136.08 | 688 |
| 3 | 68.8 | 351.8 | 74.8 | 135.7 | 670 |
| 4 | 68.4 | 347.5 | 74.4 | 133.07 | 693 |

As evidenced in Table 1 above, by changing the orientation of the eccentric cams 42 and 44, thereby changing the relative the position of the pivot axis of the shock absorber 50 by about only 3 mm, the entire geometry of the bicycle is significantly changed for a rider, and this modified geometry will translate into changes in performance and feel of the bicycle. This enables greater flexibility and adjustability of the bicycle frame geometry to best suit the rider and/or the riding conditions.

The embodiment depicted herein shows the double eccentric cam assembly connected with the shock absorber, however as noted above the double eccentric cam assembly 40 disclosed herein could also be positioned, at other pivoting joints of the frame set and its rear wheel suspension system, in addition to or in lieu of being disposed between the shock absorber 50 and the main frame 10. For example, such a double eccentric cam assembly 40 could also be provided at the lower pivot point 30 between the main frame 10 and the rear suspension system 20, or alternately within the suspension system 20 itself such as at the rearward pivot between the swing arm 22 and the seat stay 28, between the seat stay 28 and the first upper link member 24 (or the intermediate link member 35), and/or between the first upper link member 24 and the bottom of the shock absorber 50. AD of the above may also be possible.

In the depicted embodiment, the inner and outer eccentric cams 42 and 44 are four-sided and have a square/diamond shape, and therefore in this embodiment each of the square cams or chips 42, 44 has four different positions each (i.e. one for each edge of the perimeter of the respective cams), and moving each from one position to the next involves rotating it by 90 degrees. As such, the two square eccentric cams 42, 44 together permit up to nine possible total combinations and therefore provide the double eccentric cam assembly 40 with nine total different relative pivot axis positions, which according provide nine different corresponding suspension positions. Each of these nine positions is shown in FIGS. 5a-5i. As can be readily seen in FIGS. 5a-5i, the relative position of the pivot axis 41 of the assembly 40, defined by the fastener 46 extending transversely therethrough, is disposed in a slightly different location depending on the selected configuration (i.e. rotational position or orientation) of the inner and outer eccentric cams. 42, 44. Table 2 below shows the details of each of the nine double eccentric cam assembly positions shown in FIGS. 5a-5i, and reveals how each of these nine pivot axis positions varies the relative geometry of the frame set 9.

TABLE 2

| Figure No. | Setting No. | Seat tube angle (degrees) | Bottom Bracket Drop (mm) | Head tube angle (degrees) | Ride Optimization | Rider Weight |
|---|---|---|---|---|---|---|
| 5a | 1 | 74.5 | 0 | 67.5 | Neutral (default midpoint) | Neutral (mid-point) |
| 5b | 2 | 75.34 | −9.8 | 68.34 | Climbing | Neutral |
| 5c | 3 | 74.92 | −4.9 | 67.92 | Light Climbing | Lighter |
| 5d | 4 | 74.45 | −0.43 | 67.46 | Neutral | Lighter |
| 5e | 5 | 74.04 | 5.36 | 67.04 | Light Descending | Lighter |
| 5f | 6 | 73.62 | 10.27 | 66.62 | Aggressive Descending | Neutral |
| 5g | 7 | 74.08 | 4.93 | 67.08 | Less Aggressive Descending | Heavier |
| 5h | 8 | 74.51 | 0.1 | 67.51 | Neutral | Heaviest |
| 5i | 9 | 74.92 | −4.97 | 67.92 | Light Climbing | Heavier |

Accordingly, as can be seen in Table 2 above, relatively small changes to the relative position of the pivot axis 41 provided by each of the different configurations of the double eccentric cam assembly 40, each of which can be selected by the user and changed when desired, the rear wheel suspension 20 may thus be adjusted and adapted as necessary to suit certain race courses, or to suit varying riders and skill levels.

While the two square cams 42, 44 allow for nine different suspension positions, it will be understood by one skilled in the art that alternately shaped cams (ex: having three, five, six, etc. sides each instead of four) may also be possible, thereby providing multiple different positions for the joint pivot axis defined by the fastener 46 by the double eccentric cam assembly 40.

It is therefore equally possible for one or both of the inner and outer eccentric cams 42 and 44 to have another shape, in which case more or fewer different adjustment positions may be provided. For example, in an alternate embodiment, the eccentric cams 42, 44 may have any one of a diamond shape, a hexagonal shape, a triangular shape, pentagonal shape, etc. Further, while a circularly shaped eccentric cam may also be used, care would have to be taken to ensure that anti-rotational means (such as gear teeth, projecting tangs, etc.) are provided such as to prevent any unwanted rotation thereof relative to the other cam with which it is nested and/or relative to the mounting bracket of the frame. The advantage of such a circular cam, however, is that it may provide many more possible adjustment positions.

The above description is meant to be exemplary only, and one skilled in the art will recognize that changes may be made to the embodiments described without departing from the scope of the invention as defined by the appended claims. Still other modifications which fall within the scope of the present invention, as defined in the appended claims, will be apparent to those skilled in the art, in light of a review of this disclosure.

The invention claimed is:

1. A bicycle frame set comprising:
a main frame including at least a seat tube, a top tube, a head tube and a down tube having a bottom bracket affixed thereto;
a rear wheel suspension pivotally attached to said main frame by at least upper and lower frame pivots disposed at spaced apart locations on the main frame, said rear wheel suspension comprising:
a first link member having an upper end pivotally connected to said top tube of the main frame by said upper frame pivot and having a lower end pivotably connected to a rearward end of a shock absorber at a first shock pivot;
the shock absorber having a forward end pivotally connected to a shock mount on said main frame by a second shock pivot;
a swing-arm having a forward end pivotally connected with said main frame at said lower frame pivot disposed proximate to the bottom bracket and a rearward end pivotally connected with a seat stay member;
the seat stay member having a lower end pivotally connected to the swing-arm and an upper end pivotally connected with said first link member, and at least one of the lower end of the seat stay member and the rearward end of the swing-arm having a rear wheel dropout adapted for engaging a rear wheel axle thereto;
at least one double eccentric cam assembly disposed within a correspondingly shaped opening in a mounting flange on the rear wheel suspension at one or more of the upper and lower frame pivots, the first and second shock pivots, and any pivots joints interconnecting the swing-arm, the seat stay member and the first link member, the double eccentric cam assembly including
an inner eccentric cam and an outer eccentric cam which when nested together and interlocked prevent relative rotation therebetween, the inner and outer eccentric cams being interlocked by a transversely extending fastener passing through an aperture in said inner eccentric cam such as to define a pivot axis, the aperture in the inner eccentric cam being eccentric relative to a perimeter of the inner eccentric cam, the inner eccentric cam being receiving within a correspondingly shaped opening in said outer eccentric cam which is itself eccentric relative to a perimeter of the outer eccentric cam,
wherein a rotational position of each of said inner and outer eccentric cams being adjustable relative to each other and relative to the opening in the mounting flange within which the double eccentric cam assembly is disposed, such that a relative location of the pivot axis defined by the double eccentric cam assembly is adjustable relative to the mounting flange on the rear wheel suspension.

2. The bicycle frame set of claim 1, wherein the double eccentric cam assembly is disposed within at least one of the first and second shock pivots.

3. The bicycle frame set of claim 1, wherein the inner eccentric cam and the outer eccentric cam have a common perimeter shape.

4. The bicycle frame set of claim 3, wherein a perimeter of the inner eccentric cam and the outer eccentric cam has four sides, each of the inner and outer eccentric cams providing four different positions of the pivot axis of the double eccentric cam assembly.

5. The bicycle frame set of claim 4, wherein the four sides of the perimeter of the inner eccentric cam are of equal length and the four sides of the perimeter of the outer eccentric cam are of equal length, thereby defining diamond or square shaped perimeters of the inner and outer eccentric cams.

6. The bicycle frame set of claim 1, wherein the double eccentric cam assembly provides nine different relative positions of the pivot axis thereof.

7. A bicycle frame set comprising:
  a main frame including at least a seat tube, a top tube, a head tube and a down tube having a bottom bracket affixed thereto;
  a rear wheel suspension pivotally attached to said main frame by at least two pivots disposed at spaced apart locations on the main frame;
  a double eccentric cam assembly disposed within one or more pivot joint between the main frame and the rear wheel suspension, the double eccentric cam assembly including an inner eccentric cam and an outer eccentric cam removably fastened together and retained in place within the pivot joint by a transversely extending and removable fastener passing through an aperture in said inner eccentric cam and defining a pivot axis, the aperture in the inner eccentric cam being eccentric relative to a perimeter of the inner eccentric cam, the inner eccentric cam being received within a correspondingly shaped opening in said outer eccentric cam, said opening being itself eccentric relative to a perimeter of the outer eccentric cam;
    wherein a rotational position of each of said inner and outer eccentric cams is adjustable relative to each other and relative to the pivot joint within which the double eccentric cam assembly is disposed, so as to change a relative location of the pivot axis of the pivot joint.

8. The bicycle frame set as defined in claim 7, wherein said rear wheel suspension includes:
  a first link member having an upper end pivotally connected to said top tube of the main frame by an upper frame pivot and having a lower end pivotably connected to a rearward end of a shock absorber at a first shock pivot;
  the shock absorber having a forward end pivotally connected to a shock mount on said main frame by a second shock pivot; and
  a swing-arm having a forward end pivotally connected with said main frame at a lower frame pivot disposed proximate to the bottom bracket and a rearward end pivotally connected with a seat stay member.

9. The bicycle frame set as defined in claim 8, wherein the seat stay member has a lower end pivotally connected to the swing-arm and an upper end pivotally connected with said first link member, and at least one of the lower end of the seat stay member and the rearward end of the swing-arm having a rear wheel dropout adapted for engaging a rear wheel axle thereto.

10. The bicycle frame set as defined in claim 9, wherein the double eccentric cam assembly is disposed within one or more of: the upper and lower frame pivots, the first and second shock pivots, and any pivots joints interconnecting the swing-arm, the seat stay member and the first link member.

11. The bicycle frame set of claim 7, wherein the inner eccentric cam and the outer eccentric cam have a common perimeter shape.

12. The bicycle frame set of claim 11, wherein the perimeter of each of the inner eccentric cam and the outer eccentric cam has four sides, each of the inner and outer eccentric cams thereby providing four different relative positions of the pivot axis of the double eccentric cam assembly.

13. The bicycle frame set of claim 12, wherein the four sides of the perimeter of the inner eccentric cam are of equal length and the four sides of the perimeter of the outer eccentric cam are of equal length, thereby defining diamond or square shaped perimeters of the inner and outer eccentric cams.

14. The bicycle frame set of claim 7, wherein the double eccentric cam assembly provides nine different relative positions of the pivot axis thereof.

15. A pivot joint for providing relative rotation between frame components of a bicycle, the pivot joint comprising a double eccentric cam assembly having an outer eccentric cam interlocked with an inner eccentric cam, the inner and outer eccentric cams being fastened together and retained in place within the pivot joint by a transversely extending and removable fastener passing through an aperture in said inner eccentric cam, the fastener defining a pivot axis of the pivot joint therethrough, the aperture within the inner eccentric cam is eccentrically disposed relative to a perimeter of the inner eccentric cam, and said inner eccentric cam is received within a correspondingly shaped opening in the outer eccentric cam, said opening being eccentrically disposed relative to a perimeter of the outer eccentric cam, wherein a relative orientation of said inner and outer eccentric cams is rotationally adjustable so as to change a relative location of the pivot axis of the pivot joint; and wherein the perimeter of the inner eccentric cam and the perimeter of the outer eccentric cam have four sides and a common shape, such that each of the inner and outer eccentric cams provide four different positions of the pivot axis of the double eccentric cam assembly.

16. The pivot joint of claim 15, wherein the double eccentric cam assembly is disposed within an opening in a mounting flange, said opening having a shape corresponding to said outer perimeter of the outer eccentric cam.

17. The pivot joint of claim 16, wherein the mounting flange is configured for installation on an element of a rear wheel suspension for the bicycle.

18. The pivot joint of claim 15, wherein the four sides of the perimeter of the inner eccentric cam are of equal length and the four sides of the perimeter of the outer eccentric cam are of equal length, thereby defining diamond or square shaped perimeters of the inner and outer eccentric cams.

* * * * *